United States Patent
Brizio

(10) Patent No.: US 10,545,872 B2
(45) Date of Patent: Jan. 28, 2020

(54) REDUCING SHARED CACHE REQUESTS AND PREVENTING DUPLICATE ENTRIES

(71) Applicant: Ikanos Communications, Inc., Fremont, CA (US)

(72) Inventor: Alberto Brizio, Rye, NY (US)

(73) Assignee: Ikanos Communications, Inc., Fremont, CA (US)

(*) Notice: Subject to any disclaimer, the term of this patent is extended or adjusted under 35 U.S.C. 154(b) by 111 days.

(21) Appl. No.: 15/276,637

(22) Filed: Sep. 26, 2016

(65) Prior Publication Data

US 2017/0091089 A1    Mar. 30, 2017

Related U.S. Application Data

(60) Provisional application No. 62/233,806, filed on Sep. 28, 2015.

(51) Int. Cl.
G06F 12/084    (2016.01)
G06F 12/128    (2016.01)
G06F 12/0855   (2016.01)

(52) U.S. Cl.
CPC ........ *G06F 12/084* (2013.01); *G06F 12/0857* (2013.01); *G06F 12/128* (2013.01); *G06F 2212/314* (2013.01)

(58) Field of Classification Search
None
See application file for complete search history.

(56) References Cited

U.S. PATENT DOCUMENTS

| | | | |
|---|---|---|---|
| 7,434,000 B1 | 10/2008 | Barreh et al. | |
| 8,285,926 B2 | 10/2012 | Karlsson | |
| 8,635,428 B2 | 1/2014 | Karlsson et al. | |
| 9,116,812 B2 | 8/2015 | Joshi et al. | |

(Continued)

FOREIGN PATENT DOCUMENTS

| AU | 2011224124 A1 | 4/2013 |
|---|---|---|
| EP | 2722763 A1 | 4/2014 |

OTHER PUBLICATIONS

Farkas, et al., "Complexity/Performance Tradeoffs With Non-Blocking Loads," Proceedings of the 21st Annual International Symposium on Computer Architecture, Apr. 18-21, 1994, Chicago, Illinois, Apr. 18, 1994, pp. 211-222, vol. 22, No. 2, , XP000480437, DOI: 10.1109/ISCA.1994.288148, ISBN: 978-0-8186-5510-4, IEEE Computer Society Press, Los Alamitos, California USA.

(Continued)

*Primary Examiner* — Edward J Dudek, Jr.
*Assistant Examiner* — Ralph A Verderamo, III
(74) *Attorney, Agent, or Firm* — Holland & Hart LLP/Qualcomm

(57) ABSTRACT

Techniques are described for reducing shared cache memory requests in a multi-threaded microprocessor-based system. One method includes receiving a request for data from a thread, identifying that the request correlates with a pending request associated with a different thread, combining the request with the pending request based on the identifying, and receiving the data after the combining, the receiving being based on the pending request. In some examples, the request may be associated with an address of a cache line in a cache memory.

30 Claims, 7 Drawing Sheets

(56) References Cited

U.S. PATENT DOCUMENTS

| | | | |
|---|---|---|---|
| 9,229,867 B2 | 1/2016 | Cantu et al. | |
| 2010/0174875 A1* | 7/2010 | Dice | G06F 9/52 |
| | | | 711/152 |
| 2010/0299481 A1* | 11/2010 | Conte | G06F 12/0811 |
| | | | 711/122 |
| 2011/0202727 A1 | 8/2011 | Speier et al. | |
| 2014/0229680 A1* | 8/2014 | Solihin | G06F 12/0817 |
| | | | 711/135 |

OTHER PUBLICATIONS

ISA/EP, International Search Report and Written Opinion of the International Searching Authority, Int'l Application No. PCT/US2016/053973, dated Nov. 29, 2016, European Patent Office, Rijswijk, NL, 13 pgs.

Jia, et al., "MRPB: Memory Request Prioritization for Massively Parallel Processors," 2014 IEEE 20th International Symposium on High Performance Computer Architecture (HPCA), Feb. 15, 2014, pp. 272-283, XP032606781, DOI: 10.1109/HPCA.2014.6835938, Institute of Electrical and Electronics Engineers. [retrieved on Jun. 16, 2014].

Lashgar, et al., "A Case Against Small Data Types in GPGPUs," 25th IEEE International Conference on Application-Specific Systems, Architectures and Processors, Jun. 18, 2014, 6 pgs, XP032626235, DOI: 10.1109/ASAP.2014.6868644, Institute of Electrical and Electronics Engineers. [retrieved on Jul. 14, 2014].

\* cited by examiner

REDUCING SHARED CACHE REQUESTS AND PREVENTING DUPLICATE ENTRIES

CROSS REFERENCES

The present Application for Patent claims priority to U.S. Provisional Patent Application No. 62/233,806 by Brizio, entitled "METHODS AND APPARATUSES FOR REDUCING SHARED CACHE REQUESTS AND PREVENTING DUPLICATE ENTRIES," filed Sep. 28, 2015, assigned to the assignee hereof, and is expressly incorporated by reference herein.

BACKGROUND

Field of the Disclosure

The present disclosure, for example, relates to cache memory, and more particularly to reducing shared cache requests and preventing duplicate entries in cache memory.

Description of Related Art

Cache memory systems are deployed to reduce memory access latency. Memory latency refers to the delay associated with retrieving instructions or data from memory, for example, in a microprocessor-based system based on cache hit or cache miss occurrences. Typically, cache memory is a storage element that is relatively small and fast compared to a system memory. In some cases, hierarchy associated with cache memory, e.g., architecture, size, and speed, can be applied to improve overall performance of a microprocessor-based system. In some cases, however, cache miss occurrences may degrade system performance and create unnecessary traffic between system components.

SUMMARY

Techniques are described for reducing shared cache memory requests in a multi-threaded microprocessor-based system. A cache memory may receive a request from a thread for data. In some cases, data may include instructions associated with one or more processes, applications, etc., running on a device associated with the cache memory. A cache management table may be implemented with a buffer to coordinate with a cache memory and identify or determine, for each incoming request, whether a similar (and in some cases still-pending) request was received from a second, different thread. The cache management table may identify that the received request correlates to the earlier, pending request associated with a second thread. Based on identifying a correlation with a pending request, the cache management table may retire, discard, combine, or buffer the received request.

A method of reducing shared cache memory requests is described. The method may include receiving a request for data from a thread, the request being associated with an address of a cache line in a cache memory; identifying that the request correlates with a pending request associated with a different thread; combining the request with the pending request based at least in part on the identifying; and receiving the data after the combining, the receiving being based at least in part on the pending request.

An apparatus for reducing shared cache memory requests is described. The apparatus may include a processor, memory in electronic communication with the processor. The processor and memory may be configured to receive a request for data from a thread, the request being associated with an address of a cache line in a cache memory; identify that the request correlates with a pending request associated with a different thread; combine the request with the pending request based at least in part on the identifying; and receive the data after the combining, the receiving being based at least in part on the pending request.

Another apparatus for reducing shared cache memory requests is described. The apparatus may include means for receiving a request for data from a thread, the request being associated with an address of a cache line in a cache memory; means for identifying that the request correlates with a pending request associated with a different thread; means for combining the request with the pending request based at least in part on the identifying; and means for receiving the data after the combining, the receiving being based at least in part on the pending request.

A non-transitory computer readable medium for wireless communication is described. The non-transitory computer-readable medium may include instructions operable to cause a processor to receive a request for data from a thread, the request being associated with an address of a cache line in a cache memory; identify that the request correlates with a pending request associated with a different thread; combine the request with the pending request based at least in part on the identifying; and receive the data after the combining, the receiving being based at least in part on the pending request.

Some examples of the method, apparatus, and non-transitory computer-readable medium described above, combining the request with the pending request may further include processes, features, means, or instructions for preventing delivery of the request to the cache memory. Some examples of the method, apparatus, and non-transitory computer-readable medium described above, combining the request with the pending request may further include processes, features, means, or instructions for sending the data to the thread and to the different thread in response to the pending request based at least in part on linking the request and the pending request.

Some examples of the method, apparatus, and non-transitory computer-readable medium described above, may further include processes, features, means, or instructions for identifying that the address of the cache line is unfilled based at least in part on the combining; filling the address of the cache line based at least in part on the data and identifying that the address of the cache line is unfilled; and sending the data to the thread and the different thread based at least in part on the filling.

Some examples of the method, apparatus, and non-transitory computer-readable medium described above, identifying that the request correlates with the pending request may further include processes, features, means, or instructions for comparing the address to one or more fields of a cache management table stored in a buffer before querying the cache memory. In some examples of the method, apparatus, and non-transitory computer-readable medium described above, the one or more fields comprise at least one of a data field and a control field. In some examples of the method, apparatus, and non-transitory computer-readable medium described above the data field comprises addresses associated with data stored in the cache memory, or a higher level memory, or a combination thereof.

In some examples of the method, apparatus, and non-transitory computer-readable medium described above, the control field comprises a bit field indicating whether the request is valid. Some examples of the method, apparatus, and non-transitory computer-readable medium described above, may further include processes, features, means, or instructions for identifying a cache fill operation associated with the pending request based at least in part on information in the control field.

Some examples of the method, apparatus, and non-transitory computer-readable medium described above, identifying that the request correlates to the pending request may further include processes, features, means, or instructions for identifying a match between the address associated with the request and an address associated with the pending request based at least in part on the comparing.

Some examples of the method, apparatus, and non-transitory computer-readable medium described above, combining the request with the pending request may further include processes, features, means, or instructions for updating at least some of the one or more fields based at least in part on the identifying the match. Some examples of the method, apparatus, and non-transitory computer-readable medium described above, updating at least some of the one or more fields may further include processes, features, means, or instructions for updating a bitmap associated with the different thread in the cache management table, wherein the bitmap associates one or more requesting threads with a corresponding cache line.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
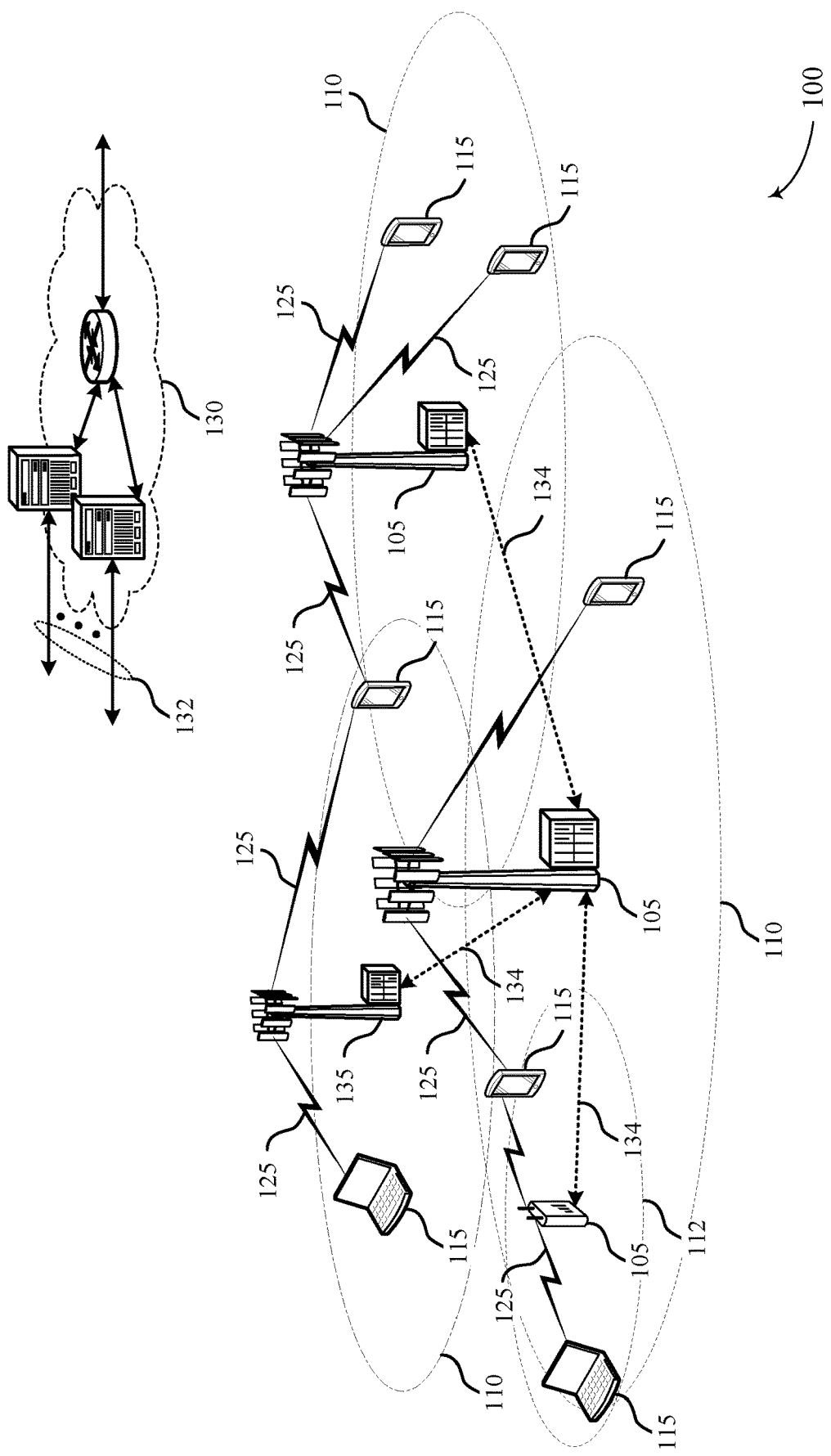
FIG. 1 shows an example of a device configured for reducing shared cache memory requests in wireless communication system, in accordance with one or more aspects of the present disclosure.

In some examples, cache memory systems are deployed to reduce memory access latency. Memory latency refers to the delay associated with retrieving instructions or data from memory, for example, in a microprocessor-based system based on cache hit or cache miss occurrences. Typically, cache memory is a storage element, located on a memory chip, that is relatively small and fast compared to a system memory. In some cases, hierarchy associated with cache memory, e.g., architecture, size, and speed can be applied to improve overall performance of a microprocessor-based system. For example, a microprocessor-based system may include a cache memory including level-1 (L1) and level-2 (L2). An L1 cache memory may be built onto a microprocessor chip itself and be specific a thread, whereas an L2 cache memory may be built on a separate chip and may be associated with multiple threads; but, may be accessible faster than accessing a larger system memory.

A cache memory may receive a request from one or more threads to retrieve data from a cache line in cache memory. A cache hit occurs when a processor identifies a copy of the requested data in a cache memory. Alternatively, a cache miss occurs when a processor cannot identify a copy of the requested data in the cache memory. As a result of a cache miss, the processor may retrieve the requested data from a higher level cache or a system memory, and then associate the data with the cache memory. The retrieved data may be made available to the processor or, in the case of higher level caches, to a lower level cache. These cache misses are costly for performance of a microprocessor-based system because they require a processor to halt operations until the requested data is retrieved.

One or more cache memory can be dedicated or shared among multiple threads. In some cases, a cache memory may receive requests for data within a small interval of time from two or more threads associated with multi-threaded processor units. If these multiple requests occur before a cache line of the cache memory has been filled, it will result in multiple misses. Additionally, if each miss results in a request to a higher level cache or a system memory, the duplicate requests create redundant traffic and contribute to a longer memory latency. In some cases, based on the multiple misses, multiple identical copies of data may be returned to the requesting cache memory. These multiple identical copies may be handled as separate values and stored in different cache memory entries, and consume valuable memory resources.

A cache management manager may receive a request from a thread for data. In some cases, data may include instructions associated with one or more processes, applications, etc., running on a device associated with a cache memory. A cache management manager may coordinate with a buffer, cache directory, and/or a cache management table to identify or determine, for each incoming request, whether a similar (and in some cases still-pending) request was received from a second, different thread. The cache management manager may identify that the received request correlates to the earlier, pending request associated with a second thread using the cache management table. Based on identifying a correlation with a pending request, the cache management manager may retire, discard, combine, or buffer the received request. In some cases, this may include preventing passing the request to a cache memory line. In further cases, the cache management manager may attach information to the correlated pending request indicating that when a corresponding cache line is returned in response to the pending request, the instruction or data will be made available to all the threads that have been associated with the request.

In some cases, the cache management manager may identify that the received request correlates to an earlier pending request based on performing a comparator operation. Cache management manager may receive a request and store the request in the cache management table. In some cases, each request may include corresponding data fields and control fields. A control field may indicate whether the request is valid or invalid, or whether the request has been sent to a higher level cache memory or to a system memory.

In some cases, a control field may include a bitmap, where each bit corresponds to a particular thread. A data field, in some cases, may include an address requested to a higher level cache memory or system memory. The cache management table may receive requests from a thread, before analyzing whether a pending request exists in a cache line of a cache memory, the cache management manager may analyze the cache management table for any existing pending requests that correlate to the received requests. In some cases, the cache management manager may compare an address field between the received request and a pending request in the cache management table.

Based on identifying that the address field of the received request correlates with an address field of a pending request, the cache management manager may update a bitmap field to record that the requesting thread is interested in a corresponding cache line, in the cache management table. In some cases, the cache management manager may use the bitmap to identify the awaiting threads and transmit a cache line to all of the threads while in parallel populating the cache memory as well.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows an example of a device configured for reducing shared cache memory requests in wireless communications system 100, in accordance with one or more aspects of the present disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term user equipment (UE) may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The DL transmissions may also be called forward link transmissions while the UL transmissions may also be called reverse link transmissions. Each communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) (e.g., using paired spectrum resources) or TDD operation (e.g., using unpaired spectrum resources). Frame structures for FDD (e.g., frame structure type 1) and Time Division Duplexing (TDD) (e.g., frame structure type 2) may be defined.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data. Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
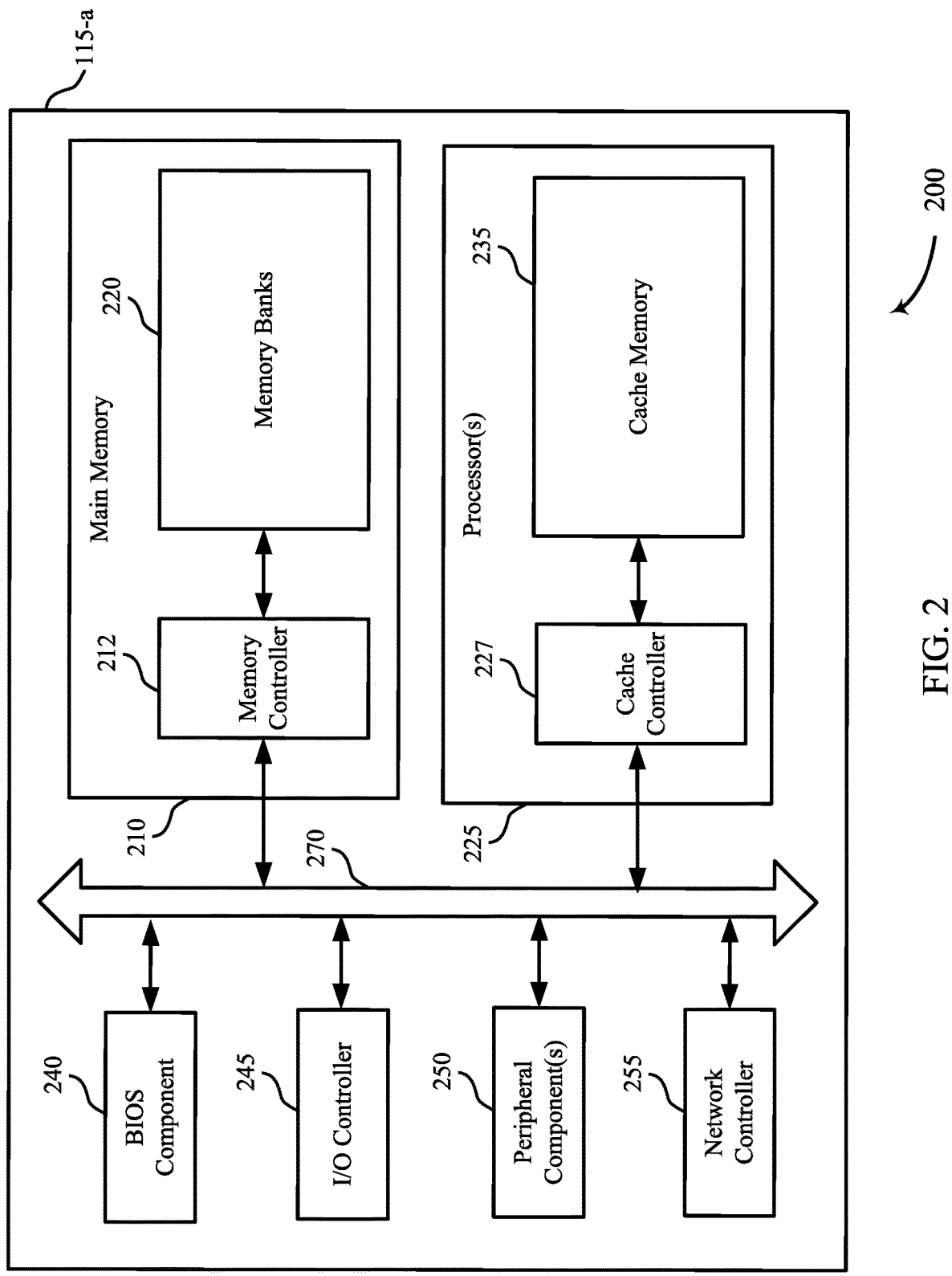
FIG. 2 shows a block diagram of a device configured for reducing shared cache memory requests, in accordance with one or more aspects of the present disclosure.

FIG. 2 shows a block diagram 200 of a device 115-a configured for reducing shared cache memory requests, in accordance with one or more aspects of the present disclosure. In some examples, device 115-a may be an example of one or more aspects of UE 115 described with reference to FIG. 1. In some examples, the device 115-a may be a cellular phone, a personal digital assistant (PDA), a wireless modem, a wireless communication device, a handheld device, a tablet computer, a laptop computer, a cordless phone, a wireless local loop (WLL) station, among others, as described with reference to FIG. 1. The device 115-a may, in some examples, have an internal power supply (not shown), such as a small battery, to facilitate mobile operation. In some examples, the device 115-a may include main memory 210, processor(s) 225, BIOS component 240, input/output (I/O) controller 245, peripheral component(s) 250, and network controller 255. In some cases, main memory 210, processor(s) 225, BIOS component 240, I/O controller 245, peripheral component(s) 250, and network controller 255 may communicate with each other, directly or indirectly, over via bus 270.

In some examples, one or more components of the device 115-a may, individually or collectively, be implemented using one or more application-specific integrated circuit (ASIC) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, a field-programmable gate array (FPGA), and other Semi-Custom ICs), which may be programmed in any manner known in the art. The functions of each component may also be implemented, in whole or in part, with instructions embodied in a memory, formatted to be executed by one or more general or application-specific processors.

In some examples, main memory 210 may include a random access memory (RAM) or read-only memory (ROM). In some examples, main memory 210 may include a memory controller 212 and memory banks 220. Memory controller 212 may include digital circuit logic that controls access and flow of data to and from memory banks 220. Additionally, memory controller 212 may generate interface signals (e.g., access signal) to support communication between memory banks 220 and peripheral component(s) 250. In some cases, memory controller 212 may be a discrete circuit chip positioned external to main memory 210. Alternatively, memory controller 212, in some examples, may be integrated with processor(s) 225. In some examples, memory controller 212 may include logic for reading and writing to memory banks 220. Additionally, memory controller 212 may include logic for reading and writing to cache memory 235 via cache controller 227.

Memory banks 220 may store various data. In some examples, various data stored may include, but is not limited to, instructions, software, routines, among others. For example, memory banks 220 may store instructions and data associated with one or more applications running on device 115-a. In some examples, memory banks 220 may provide stored instructions and data to memory controller 212 for further handling (e.g., transferring to and from processor(s) 225, or cache controller 227, or cache memory 235). For example, main memory 210 may receive a request from processor(s) 225 for instructions or data stored in memory banks 220. In some examples, memory controller 212 may receive the request from processor(s) 225 and initiate an operation to retrieve the requested instructions or data from memory banks 220. In some cases, memory controller 212 may transmit a command signal, an address signal, or a combination thereof, to memory banks 220 for initiating an operation to retrieve the requested instructions or data. In some cases, the transmitted request may include an address associated with a location of the instructions or data in memory banks 220. As a result, memory controller 212 may communicate, directly or indirectly, with memory banks 220 to locate and retrieve instructions or data from memory banks 220 based on the address included in the request.

The processor(s) 225, in some examples, may be configured to control main memory 210 via memory controller 212 using bus 270. The processor(s) 225 may be a multi-thread processor, a general-purpose processor, a digital signal processor (DSP), an ASIC, a FPGA, or other programmable logic device, discrete gate or transistor logic, discrete hardware components, or a combination of these types of components. In some examples, processor(s) 225 may be a multicore processor. In some examples, processor(s) 225 may perform various functions described herein. In some examples, processor(s) 225 may include cache controller 227 and cache memory 235. Processor(s) 225 may, for example, be configured to execute computer-readable instructions stored in cache memory 235 to cause device 115-a to perform various functions or tasks, or retrieve or store data in cache memory 235.

In some examples, cache controller 227 may control access to one or more levels of cache memory 235. In some cases, cache controller 227 may be integrated with circuitry associated with processor(s) 225. In some cases, cache controller 227 may include digital circuit logic that controls access and flow of data to and from cache memory 235. Additionally, cache controller 227 may generate interface signals (e.g., access signal) to support communication between cache memory 235 and processor(s) 225, or peripheral component(s) 250. In some cases, cache controller 227 may be a circuit chip integrated with cache memory 235. In some examples, cache controller 227 contains logic for reading and writing to cache memory 235 based on a received request for instructions or data.

Cache memory 235, in some examples, may be a RAM. In some examples, cache memory 235 may be a predetermined sized block of RAM. In some examples, cache memory 235 may include cache blocks or cache lines. The cache blocks or cache lines may include multiple bytes of data. In some examples, cache memory 235 may be partitioned into discrete sets with each set including a predetermined number of cache blocks or cache lines. Additionally, cache memory 235, in some examples, may store a subset of data stored in main memory 210. In some examples, cache memory 235 may store a copy of data stored in memory banks 220. The copied data stored in cache memory 235 may include an address indicating a location of the copied data. In some examples, cache memory 235 may store both copies of memory address and data stored in main memory 210.

In some examples, cache memory may include an L1 cache memory, or an L2 cache memory, or a combination thereof as described with reference to FIG. 3. In some examples, an L1 cache memory may be built onto a microprocessor chip independently and be specific to a thread, whereas an L2 cache memory may be built on a separate chip and may be associated with multiple threads; but, may be accessible faster than accessing a larger system memory, i.e., main memory 210. In some examples, cache memory 235 may be associated with cache management manager (e.g., cache management manager 315). In some examples, the cache management manger may be part of an inline buffer (not shown). The inline buffer may be partitioned into two units (not shown). A first unit may serve as a buffer for incoming requests from one or more threads executing on processor(s) 225. Additionally, a second unit may serve as logic for identifying duplicate requests for instructions or data from two or more threads executing on processor(s) 225. In some examples, the first unit may be one or more aspects of inline buffer 310 as described with reference to FIG. 3. Additionally, the second unit may be one or more aspects of cache management manager 315 as described with reference to FIG. 3.

In some examples, processor(s) 225 may receive a request for instructions or data from a thread. Additionally or alternatively, the received request may be from multiple threads executed and processed by processor(s) 225. In some cases, processor(s) 225 may determine whether the requested instructions or data are stored in cache memory 235 prior to initiating an operation to retrieve the requested instructions or data from main memory 210. In some examples, the determination may be based on processor(s) 225 performing a comparison operation. For example, processor(s) 225 may compare an address associated with the requested instructions or data to addresses stored in cache memory 235 via cache controller 227. In some examples, processor(s) 225 may determine that the requested instructions or data exist in cache memory 235 based on the comparison. If processor(s) 225 determines that a match associated with the address exits, processor(s) 225 may register the comparison operation as a cache hit. As a result, processor(s) 225 may provide the requested instructions or data from cache memory 235 using cache controller 227. In some examples, based on receiving a request for instructions or data from multiple threads, processor(s) 225 may provide the requested instructions or data to the multiple threads.

Alternatively, in some examples, processor(s) 225 may determine that the requested instructions or data do not exist in cache memory 235 based on the comparison operation. For example, if processor(s) 225 determines that no match exists between the address associated with the request and an address field in cache memory 235, processor(s) 225 may register the comparison operation as a cache miss. As a result, processor(s) 225 may send a request to main memory 210 to provide the received requested instructions or data. In some cases, the request may be a fetch operation, i.e., retrieve the requested instructions or data from a higher level memory.

In some examples, processor(s) 225 may receive a subsequent request for instructions or data from a different thread. In some cases, processor(s) 225 may identify that the received subsequent request correlates to an earlier pending request using a cache management table, as described elsewhere herein. In some cases, processor(s) 225 may receive a request and store the request in a cache management table. In some cases, each request may include corresponding data fields and control fields. A control field may indicate whether the request is valid or invalid, or whether the request has been sent to a higher level memory, as an example of the earlier received request. In some cases, a control field may include a bitmap, where each bit corresponds to a particular thread. A data field, in some cases, may include an address requested to a higher level memory.

In some aspects, processor(s) 225 may receive requests from a thread, before analyzing whether a pending request exists in a cache line of cache memory 235, processor(s) 225 may analyze a cache management table for any existing pending requests that correlate to the received subsequent request. In some cases, the processor(s) 225 may compare an address field between the received subsequent request and a pending request in a cache management table. Based on identifying that the address field of the received subsequent request correlates with an address field of a pending request, the processor(s) may update a bitmap field to record that a requesting thread associated with the subsequent request is interested in a corresponding cache line.

In some examples, if no correlation exists between a pending request and the subsequent request, processor(s) 225 may send the subsequent request to main memory 210 including the address associated with the requested instructions or data. In some cases, the requested instructions or data may be stored in memory banks 220. Memory controller 212 may control one or more functions of memory banks 220. For example, memory controller 212 may receive the subsequent request including the address associated with instructions or data from processor(s) 225. As a result, memory controller 212 may retrieve the requested instructions or data from memory banks 220. After retrieving the instructions or data from memory banks 220, memory controller 212 may transmit the instructions or data to processor(s) 225 via bus 270. In some examples, after processor(s) 225 receives the instructions or data from main memory 210, processor(s) 225 may fill a vacant cache line in cache memory 235 with the received instructions or data for future requests. In some examples, after processor(s) 225 receives the instructions or data from main memory 210, processor(s) 225 may fill a vacant cache line in an L1 cache of processor(s) 225 with the received instructions or data for future requests. In some examples, processor(s) 225 may provide the received instructions or data to a corresponding requesting thread. In further examples, processor(s) 225 may fill a vacant cache line in cache memory 235, while in parallel providing the received instructions or data to one or more corresponding requesting threads, as described elsewhere herein. In some cases, a subsequent request may correlate with a pending request, where the pending request is associated with a cache miss. As a result, processor(s) 225 may attach information to a correlated pending request indicating that when a corresponding cache line is returned in response to the pending request, the instruction or data will be made available to all the threads that have been associated with the request, e.g., thread associated with subsequent request.

The components of device 115-a, including memory controller 212, memory banks 220, cache controller 227, and cache memory 235 may include circuitry designed to carry out their functions. This may include various circuit elements, for example, conductive lines, transistors, capacitors, inductors, resistors, amplifiers, or other active or inactive elements, configured to carry out the functions described herein.

The basic input/output system (BIOS) component 240 may be a software component that includes a BIOS operated as firmware, which may initialize and run various hardware components of the device 115-a. The BIOS component 240 may also manage data flow between processor(s) 225 and various other components, e.g., I/O controller 245, peripheral component(s) 250, etc. The BIOS component 240 may, additionally or alternatively, include a program or software stored in read-only memory (ROM), flash memory, or any other non-volatile memory.

The peripheral component(s) 250 may be any input or output device, or an interface for such devices, that is integrated into the device 115-a. Examples of peripheral devices may include disk controllers, sound controllers, graphics controllers, Ethernet controllers, modems, USB controllers, serial or parallel ports, or peripheral card slots, such as peripheral component interconnect (PCI) or accelerated graphics port (AGP) slots.

The I/O controller 245 may manage data communication between processor(s) 225 and peripheral component(s) 250 and/or a solid state drive (SSD) (not shown)). I/O controller 245 may additionally manage peripherals not integrated into device 115-a. In some cases, I/O controller 245 may represent a physical connection or port to an external peripheral.

Network controller 255 may be configured to control and coordinate transmitting instructions or data between processor(s) 225 and one or more other components (not shown) coupled to processor(s) 225 via network (e.g., core network 130). In some examples, network controller 255 may be configured to perform data processing to implement an Ethernet (IEEE 802.3) networking standard, although it is contemplate that any suitable networking standard (e.g., LTE) may be implemented.

Figure 3:
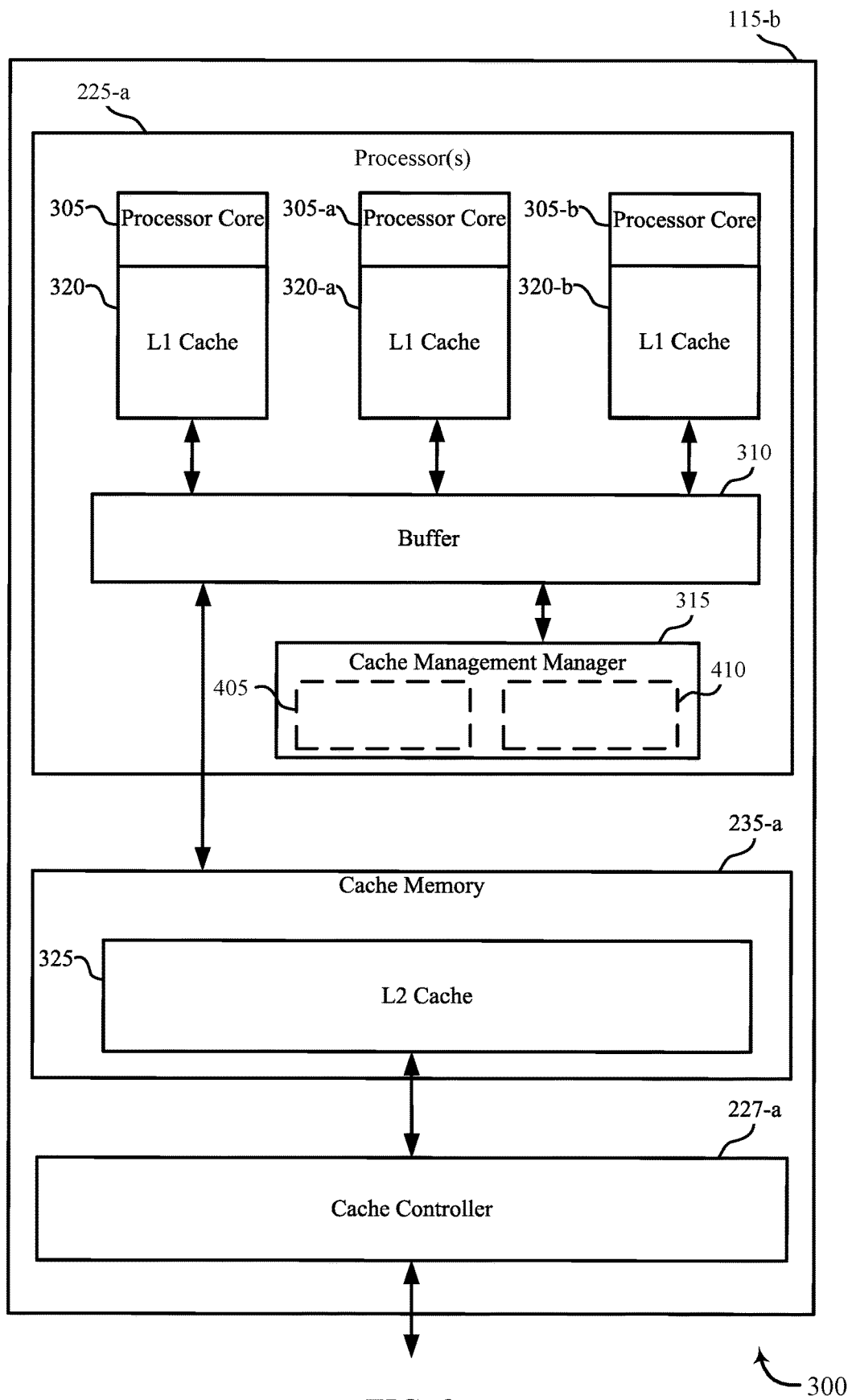
FIG. 3 shows a block diagram of a device configured for reducing shared cache memory requests, in accordance with one or more aspects of the present disclosure.

FIG. 3 shows a block diagram 300 of a device 115-b configured for reducing shared cache memory requests, in accordance with one or more aspects of the present disclosure. In some examples, device 115-b may be an example of one or more aspects of UE 115 described with reference to FIG. 1. In some examples, device 115-b may be an example of one or more aspects of device 115-a described with reference to FIG. 2. In some examples, device 115-b may be a cellular phone, a personal digital assistant (PDA), a wireless modem, a wireless communication device, a handheld device, a tablet computer, a laptop computer, a cordless phone, a wireless local loop (WLL) station, among others, as described with reference to FIG. 1. Additionally, device 115-b may, in some examples, have an internal power supply (not shown), such as a small battery, to facilitate mobile operation.

In some examples, device 115-b may include processor(s) 225-a, cache memory 235-a, and cache controller 227-a. In some examples, processor(s) 225-a may be an example of one or more aspects of processor(s) 225 described with reference to FIG. 2. In some examples, cache memory 235-a may be an example of one or more aspects of cache memory 235 described with reference to FIG. 2. In some examples, cache controller 227-a may be an example of one or more aspects of cache controller 227-a described with reference to FIG. 2. In some examples, processor(s) 225-a, cache memory 235-a, and cache controller 227-a may communicate with one another, directly or indirectly, via one or more buses.

In some examples, processor(s) 225-a may include processor core 305, processor core 305-a, processor core 305-b, an inline buffer 310, and a cache management manager 315. In some examples, processor core 305, processor core 305-a, processor core 305-b, inline buffer 310, and cache management manager 315 may communicate with one another, directly or indirectly, via one or more buses. In some examples, processor core 305, processor core 305-a, processor core 305-b may include corresponding L1 cache 320, L1 cache 320-a, and L1 cache 320-b. Processor core 305, processor core 305-a, and processor core 305-b may be configured to execute instructions, software, routines, registers, addressing modes, interrupt and exception handing and external I/O handling according to an instruction set architecture (ISA). In some examples, each of processor core 305, processor core 305-a, and processor core 305-b may be configured to operate independently from one another. In some examples, processor core 305, processor core 305-*a*, and processor core 305-*b* may communicate with one another, either directly or indirectly, via a bus. In some examples, processor core 305, processor core 305-*a*, and processor core 305-*b* may execute instructions, routines, software, etc., synchronously, i.e., in parallel with one another.

In some examples, each of processor core 305, processor core 305-*a*, and processor core 305-*b* may configured to process and execute multiple threads. Each processor core 305, processor core 305-*a*, and processor core 305-*b* may be configured to process and execute multiple threads in parallel. In some examples, a thread may include instructions, software, routines that execute and processes independently from instructions, software, routines associated with a different thread. For example, processor core 305 may process instructions from one or more threads associated with a first application, while processor core 305-*a* may process instructions from one or more threads associated with a second application. In some examples, each of processor core 305, processor core 305-*a*, and processor core 305-*b* may execute and process multiple threads corresponding to different applications, concurrently.

In some examples, each of processor core 305, processor core 305-*a*, and processor core 305-*b* may configured to communicate, directly or indirectly, with inline buffer 310. Inline buffer 310 may be configured to temporarily store data that may be transmitted to and from processor core 305, processor core 305-*a*, processor core 305-*b*, cache management manager 315, cache memory 235-*a*, or one or more other components of device 115-*b*. In some examples, processor core 305, or processor core 305-*a*, or processor core 305-*b* may receive a request for data from multiple threads. For example, processor core 305 may receive a request for data or instructions from one or more threads executing via processor core 305.

In some examples, the request may include an address associated with the data or instructions. For example, the address may correspond to a cache line or cache block in cache memory 235-*a*. In some examples, processor core 305 may transmit the request to inline buffer 310. Inline buffer 310 may receive the transmitted request and temporarily store the request in a vacant block of inline buffer 310. In some examples, inline buffer 310 may transmit the request to cache management manager 315 for further processing and handling of the request. In some examples, inline buffer 310 may delay transmitting the request to cache memory 235-*a* in order to allow cache management manager 315 to perform one or more operations associated with the request. In other words, inline buffer 310 may prevent delivery of the request for instructions or data received from a thread to cache memory 235-*a* for further processing.

In some examples, cache memory 235-*a* may be dedicated or shared among multiple threads associated with processor core 305, processor core 305-*a*, or processor core 305-*b*. In some cases, cache memory 235-*a* may receive requests for data within a small interval of time from two or more threads associated with processor core 305, processor core 305-*a*, or processor core 305-*b* from inline buffer 310. If these multiple requests occur before a cache line of cache memory 235-*a* has been filled, in response to a previous cache miss occurrence, it will result in multiple misses. Additionally, if each miss results in a request to a higher level cache (e.g., L2 cache) or a system memory (e.g., main memory 210), the duplicate requests create redundant traffic and contributes to a longer memory latency. In some cases, based on the multiple misses, multiple identical copies of data may be returned to cache memory 235-*a*. These multiple identical copies may be handled as separate values and stored in different cache lines, and consume valuable memory resources. Cache management manager 315 may include software, routines, or logic for reducing shared cache memory requests. In some examples, cache management manager 315 may coordinate received requests for instructions or data from multiple threads prior to transmitting the request to cache memory 235-*a* via inline buffer 310.

Figure 4:
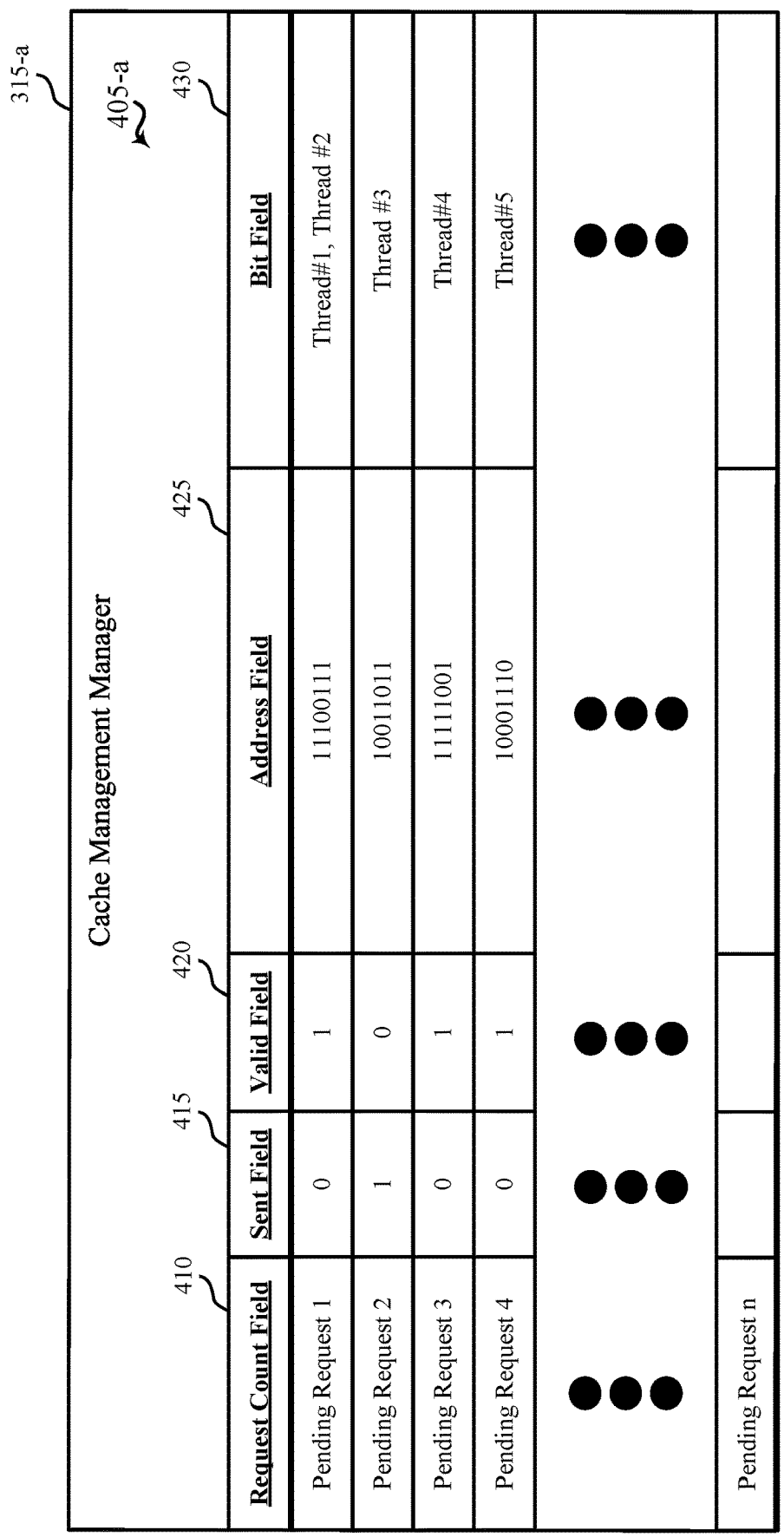
FIG. 4 shows an example illustration of a cache management table for reducing shared cache memory requests, in accordance with one or more aspects of the present disclosure.

In some examples, cache management manager 315 may include a cache management table 405 as further described in FIG. 4, and a cache directory 410. In some examples, cache management table 405 may include information associated with tracking pending request to higher level memory (e.g., L2 cache) and/or system memory (e.g., main memory 210). Alternatively, cache directory 410, in some examples, may include information associated with data stored in cache lines of cache memory 235-*a*. In some examples, cache directory 410 may include information associated with data stored in one or more of L1 cache 320, L1 cache 320-*a*, L1 cache 320-*b*, or L2 cache 325. For example, each processor core, e.g., processor core 305, processor core 305-*a*, and processor core 305-*b*, may have an independent L1 cache designated. As a result, cache management manager 315 may include a cache directory for each L1 cache, e.g., L1 cache 320, L1 cache 320-*a*, and L1 cache 320-*b*, associated with a corresponding processor core. In some examples, cache management manager 315, cache management table 405, and/or cache directory 410 may be part of inline buffer 310.

In some examples, cache management manager 315 may prevent delivery of a request to cache memory 235-*a*. In some examples, cache management manager 315 may receive the request and prior to forwarding the request to cache memory 235-*a*, cache management manager 315 may analyze one or more fields in cache management table 405 and/or cache directory 410. For example, cache management manager 315 may compare an address to one or more fields of cache management table 405 before querying cache memory 235-*a*. In some examples, cache management manager 315 may compare an address to one or more fields in cache directory 410. In some examples, the one or more fields may include a data field and a control field. A data field of cache directory 410 may include addresses associated with data stored in an L1 cache (e.g., L1 cache 320, L1 cache 320-*a*, L1 cache 320-*b*), or cache memory 235-*a*, or a higher level memory (e.g., L2 cache 325, main memory 210), or a combination thereof. For example, one or more data fields in cache directory 410 may correspond to one or more data or instructions stored in L1 cache 320, L1 cache 320-*a*, or L1 cache 320-*b*, or a combination thereof. Alternatively, one or more data fields in a cache directory 410 may correspond to one or more data or instructions stored in L2 cache 325.

In some examples, analyzing one or more fields may include, cache management manager 315 comparing an address associated with the instructions or data to addresses associated with cache lines in cache directory 410. In some examples, cache management manager 315 may receive a first request for instructions or data from a thread executing on processor core 205. In some examples, the first request may include an address associated with the instructions or data. For example, an address may be a memory address associated with a location of the instructions or data in memory. The cache management manager 315 may analyze one or more fields in a cache directory 410 to determine whether the requested instructions or data are stored in a corresponding L1 cache (e.g., in L1 cache 320, L1 cache 320-*a*, or L1 cache 320-*b*) associated with the requesting thread. In some examples, cache management manager 315 may analyze one or more fields in cache directory 410 to determine whether the requested instructions or data are stored in an L2 cache (e.g., L2 cache 325) and/or a system memory (e.g., main memory 210).

Cache management manager 315 may determine either a cache hit occurrence or a cache miss occurrence based on the comparison. A cache hit occurrence may indicate that a cache line in cache memory 235-*a* includes the requested instructions or data based on analyzing cache directory 410. Alternatively, a cache miss occurrence may indicate that a cache line in cache memory 235-*a* may be absent of the requested instructions or data based on analyzing the cache directory 410. As a result, cache management manager 315 may record an instance of the thread requesting for the instructions or data and queue a cache line fill operation. For example, cache management manager 315 may designate an entry in cache management table 405 for the first request. The entry may include one or more fields associating the first request with the instructions or data. For example, an entry in cache management table 405 for the first request may identify a request count field, a sent field, a valid field, an address field, and a bit field, as described with reference to FIG. 4. In some examples, cache management manger 315 may use cache management table 405 to track pending requests associated with threads to a higher level cache (e.g., L2 cache 325) or a system memory (e.g., main memory 210).

In some examples, cache management manager 315 may determine whether a request in cache directory 410 is valid based on information related to a valid field. The valid field may indicate whether an address associated with the request is valid. In some cases, the valid field may include a binary value, e.g., one or zero. In some examples, cache management manager 315 may compare an address associated with a request with addresses corresponding to one or more cache lines in cache directory 410. If cache management manager 315 determines that a match exists between the address of the request and at least one address in a cache line in cache directory 410, cache management manager 315 may analyze a valid field. Cache management manager 315 may determine that the valid field has a binary value one. Based on the valid field including a binary value one, cache management manager 315 may determine that the requested instructions or data are present in the corresponding cache line. In some examples, a cache line in cache directory 410 may correspond to one or more cache lines in an L1 cache of a processor core and/or cache memory 235-*a*.

Alternatively, cache management manager 315 may identify that an address of a cache line is unfilled. For example, if the cache management manager 315 determines that a valid field has a binary value zero, cache management manager 315 may determine that the requested instructions or data are not in the corresponding cache line, i.e., a cache miss occurrence. As a result of a cache miss occurrence, cache management manager 315 may record an instance of the cache miss occurrence and associate a corresponding thread. For example, cache management manager 315 may record an instance in cache management table 405. The cache management manager 315 may then initiate a cache line fill operation. The cache line fill operation may include retrieving the requested instructions or data from main memory 210 as described with reference to FIG. 2. In some examples, main memory 210 may provide the requested instructions or data to cache controller 227-*a*. Cache controller 227-*a* may fill an address of a vacant cache line (i.e., unfilled cache line) by sending the received instructions or data from main memory 210 to the vacant cache line. In some examples, a vacant cache line may correspond to a cache line in either L1 cache 320, L1 cache 320-*a*, L1 cache 320-*b*, or L2 cache 325. In some examples, after the cache fill operation, cache management manager 315 may update one or more corresponding fields in cache management table 405 and/or cache directory 410 to associate a requesting thread with instructions or data and/or to indicate the filling of a cache line in either L1 cache 320, L1 cache 320-*a*, L1 cache 320-*b*, or L2 cache 325.

A cache line fill operation may include retrieving the requested instruction or data from a higher level memory compared to cache memory 235-*a*. In some examples, cache management manager 315 may transmit a cache line fill operation signal to cache memory 235-*a* via inline buffer 310, and cache memory 235-*a* may transmit the cache line fill operation signal to cache controller 227-*a*. Cache controller 227-*a* may transmit the cache line fill operation to main memory 210 requesting for the instructions or data associated with the first request from the thread.

In some examples, cache management manager 315 may receive one or more subsequent requests for instructions or data from one or more different threads. In some examples, cache management manager 315 may receive a second request for instructions or data from a different thread executing on processor core 205. In some examples, the different thread associated with the second request may be executing on a different processor core (e.g., processor core 205-*a*) other than processor core 205.

In some examples, cache management manager 315 may verify for each incoming subsequent request whether a pending request has been previously recorded in cache management table 405. The pending request, in some examples, may be associated with same instructions or data. In some examples, the second request may include an address associated with the instructions or data. For example, an address may be a memory address associated with a location of the instructions or data in memory (e.g., cache memory 235-*a*, main memory 210). Cache management manager 315 may analyze one or more fields in cache management table 405 to determine whether a pending request exists for same instructions or data. For example, cache management manager 315 may receive a first request for instructions or data from a first thread executing on processor core 305. Cache management manger 315 may record the first request in cache management table 405 with information associated with the request. Additionally, cache management 315 may receive a subsequent request (e.g., second request) for instructions or data from a second thread executing on processor core 305. Based on receiving the subsequent request, cache management manger 315 may analyze contents of the request and perform a comparison operation to entries of cache management table 405. The comparison operation may correlate a subsequent request with a pending request in cache management table 405. The correlation may indicate that a pending request is queued for same instructions or data as the subsequent request.

In some examples, cache management manager 315 may identify that the second request correlates with a pending request (e.g., first request) in cache management table 405. In some examples, the pending request may be associated with a different thread compared to the second thread. In some examples, cache management manager 315 may identify that the second request correlates with a pending request based on analyzing one or more fields in cache management table 405. For example, cache management manager 315 may identify that a previous received request (i.e., pending request) associated with a thread is pending for same instructions or data based on an address associated with the pending request.

In some examples, based on identifying a correlation between the second request and a pending request (e.g., first request), cache management manager 315 may combine the second request with the pending request. In some examples, combining a current request with a pending request may include updating a bitmap in cache management table 405, where the bitmap is associated with the pending request. In some cases, retiring a second request based on identifying a correlation with a pending request may include terminating delivery of the second request to cache memory 235-a. Alternatively, based on identifying a correlation between the second request and a pending request (e.g., first request), cache management manager 315 may, in some examples, retire the second request. In some cases, retiring a second request based on identifying a correlation with a pending request may include preventing delivery of the second request to cache memory 235-a.

In some examples, identifying that the second request correlates with a pending request may be based on identifying a match between an address associated with a second request and an address associated with a pending request. In some examples, cache management manager 315 may update at least some of the one or more fields in cache management table 405 based on identifying a match. For example, cache management manager 315 may update a bitmap associated with the pending thread in cache management table 405. In some examples, a bitmap may be associated with a bit field in cache management table 405. In some cases, the bitmap associates one or more requesting threads with a corresponding cache line. For example, a bitmap associated with the pending thread may indicate that a different thread is interested in same instructions or data as the pending thread. As a result, cache management manager 315 may send the requested instructions or data to the pending thread and to the different thread based on linking the pending request and the second request. In other words, cache management manager 315 will prevent initiating a second cache line fill operation associated with the second request.

In some examples, cache management manager 315 may send received instructions or data to one or more requesting threads concurrently with filling a cache line. For example, based on a pending thread and a second thread requesting for same instructions or data, cache management manager 315 may coordinate and send requested instructions or data from cache memory 235-a to both the pending thread and the second thread concurrently. In some examples, based on a pending thread and a second thread requesting for same instructions or data, cache management manager 315 may coordinate and send requested instructions or data from cache memory 235-a to both the pending thread and the second thread concurrently, while a cache line fill operation is concurrently being performed. As a result, when a line is returned to cache memory 235-a i.e., a higher level cache (e.g., L2 cache) from main memory 210, that corresponds with instructions or data requested by a pending thread and a second thread, the line will be written once to cache memory 235-a, i.e., L2 cache and provided to both pending thread and the second thread. In some examples, when a line is returned to cache memory 235-a i.e., a higher level cache (e.g., L2 cache) from main memory 210, that corresponds with instructions or data requested by a pending thread and a second thread, the line will be written once to a corresponding L1 cache (e.g., cache memory 320) and provided to both pending thread and the second thread, for example, executing on processor core 305.

FIG. 4 shows an example illustration of a cache management manager 315-a for reducing shared cache memory requests, in accordance with one or more aspects of the present disclosure. In some examples, cache management manager 315-a may include a cache management table 405. Cache management table 405-a may include one or more aspects of cache management table 405 as described with reference to FIG. 3. In some examples, cache management table 405 may include a request count field 410, a sent field 415, a valid field 420, an address field 425, and a bit field 430. Additionally or alternatively, although cache management table 405-a may include request count field 410, sent field 415, valid field 420, address field 425, and bit field 430, cache management table 405-a may be implemented to include a portion of the fields shown or additional data and/or control fields (not shown).

In some examples, cache management table 405-a may record and store pending requests. An entry in cache management table 405-a may include data fields and control fields. In some cases, a control field may indicate whether a request is valid or not. Additionally or alternatively, a control field may indicate whether a request has been sent to a higher level cache or to a main memory. In some cases, a control field may include a bitmap. A bitmap may include one or more bits that correspond to a thread. In some examples, a data field may include address requested to a higher level cache or main memory.

In some examples, cache management table 405-a may include a request count field 410. The request count field 410 may include information indicating pending requests associated with one or more threads. For example, with reference to FIG. 3, a first thread may request for instructions or data, cache management manager 315-a may record the request in cache management table 405-a as 'pending request 1'. In some examples, cache management table 405-a may include a sent field 415. The sent field 415, in some examples, may include information indicating whether a cache line fill operation has been transmitted to cache memory 235-a. In some examples, sent field 415 may indicate whether a cache line fill operation has been initialized based on value in the sent filed 415. For example, a value zero in sent field 415 may indicate that a cache line fill operation has not been initiated. By contrast a value one in sent field 415 may indicate that a cache line fill operation has been initiated.

In some examples, cache management table 405-a may include valid field 420. Valid field 420 may indicate whether a pending request associated with the requested instructions or data is present in an entry of the cache management table 405-a. In some examples, a valid field 420 may include information indicating whether a pending request associated with the requested instructions or data is present in an entry of the cache management table 405-a based on a value in the valid filed 420. For example, if cache management manager 315-a determines that valid field 420 has a binary value one, cache management manager 315-a may determine that a pending request associated with requested instructions or data exists in cache management table 405-a. For example, if cache management manager 315-a determines that a valid field 420 has a binary value zero, cache management manager 315-a may determine that no pending request associated with the requested instructions or data exist in the cache management table 405-a.

In some examples, cache management table 405-a may include address field 425. Address field 425 may include information related to memory addresses associated with instructions or data. For example, cache management manager 315-a may receive a request for instructions or data from a thread. In some examples, the request may include an address associated with the instructions or data. In some cases, the address may indicate a location of the requested instructions or data in a location of a memory. For example, an address may include a memory location of the requested instructions or data in a cache line of cache memory 235-a. In some examples, the cache line may correspond to one or more of L1 cache 320, L1 cache 320-a, or L1 cache 320-b.

In some examples, bit field 430 may include information associated with requesting threads. For example, bit field 430 may identify one or more threads that have or are requesting for instructions or data associated with a same address. For example, in one aspect of cache management table 405-a, a first entry of bit filed 430 identifies that a first thread and a second thread have submitted a request for instructions or data that have a same address.

Figure 5:
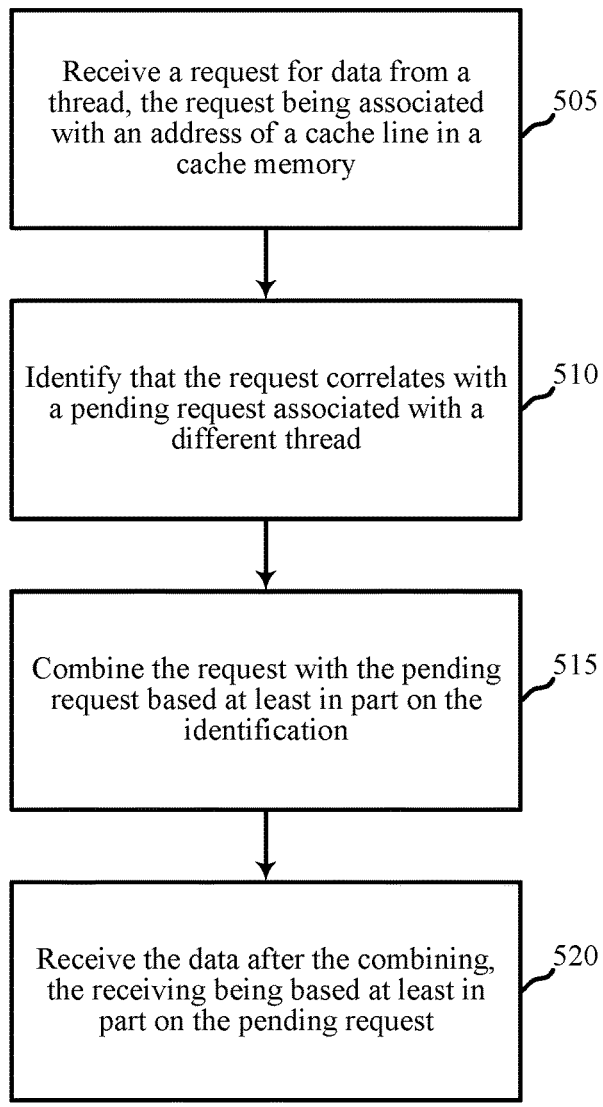
FIG. 5 is a flow chart illustrating an example of a method for reducing shared cache memory requests, in accordance with one or more aspects of the present disclosure.

FIG. 5 is a flow chart illustrating an example of a method for reducing shared cache memory requests, in accordance with one or more aspects of the present disclosure. For clarity, the method 500 is described below with reference to aspects of one or more of the device 115 described with reference to FIGS. 2 and 3, and/or aspects of the cache management table described with reference to FIG. 4. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 505, the method 500 may include receiving a request for data from a thread. In some examples, the request may be associated with an address of a cache line in a cache memory. The operation(s) at block 505 may be performed according to the methods described with reference to FIG. 2. In some examples, the operation(s) at block 505 may be performed using the inline buffer 310 described with reference to FIG. 3. In some examples, the operation(s) at block 505 may be performed using the cache management manager 315 or 315-a described with reference to FIG. 3 or 4.

At block 510, the method 500 may include identifying that the request correlates with a pending request associated with a different thread. The operation(s) at block 510 may be performed according to the methods described with reference to FIG. 2. In some examples, the operation(s) at block 510 may be performed using the cache management manager 315 or 315-a described with reference to FIG. 3 or 4

At block 515, the method 500 may include combining the request with the pending request based at least in part on the identifying. The operation(s) at block 515 may be performed according to the methods described with reference to FIG. 2. In some examples, the operation(s) at block 515 may be performed using the cache management manager 315 or 315-a described with reference to FIG. 3 or 4.

At block 520, the method 500 may include receiving the data after the combining. In some examples, the receiving of the data based may be based at least in part on the pending request. The operation(s) at block 520 may be performed according to the methods described with reference to FIG. 2. In some examples, the operation(s) at block 520 may be performed using the cache management manager 315 or 315-a described with reference to FIG. 3 or 4.

Figure 6:
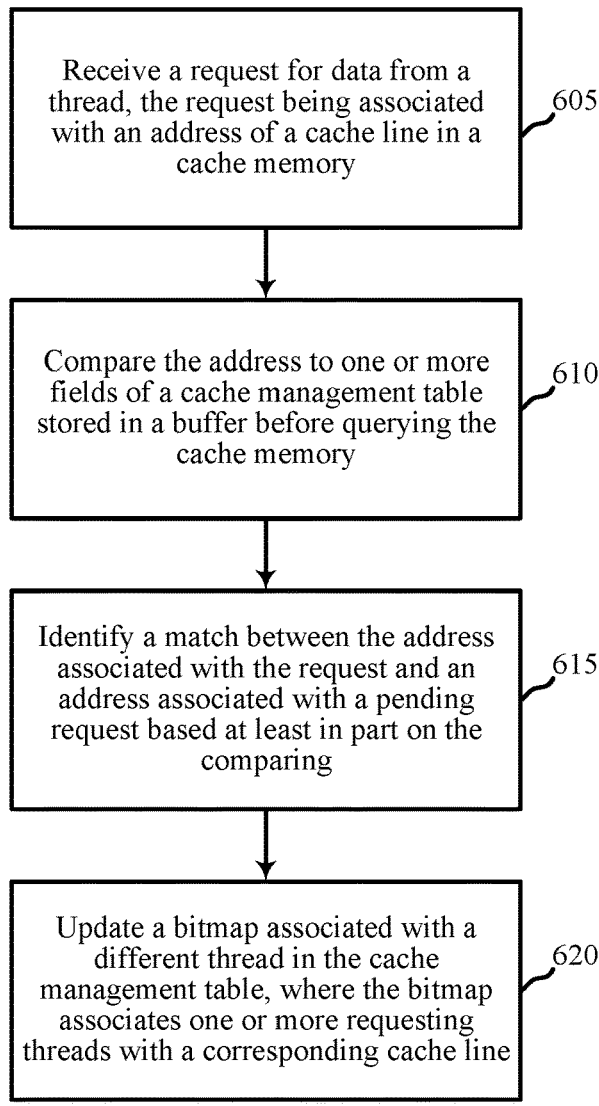
FIG. 6 is a flow chart illustrating an example of a method for reducing shared cache memory requests, in accordance with one or more aspects of the present disclosure.

FIG. 6 is a flow chart illustrating an example of a method 600 for reducing shared cache memory requests, in accordance with one or more aspects of the present disclosure. For clarity, the method 600 is described below with reference to aspects of one or more of the device 115 described with reference to FIGS. 2 and 3, and/or aspects of the cache management table described with reference to FIG. 4. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 605, the method 600 may include receiving a request for data from a thread. In some examples, the request may be associated with an address of a cache line in a cache memory. The operation(s) at block 605 may be performed according to the methods described with reference to FIG. 2. In some examples, the operation(s) at block 605 may be performed using the inline buffer 310 described with reference to FIG. 3. In some examples, the operation(s) at block 605 may be performed using the cache management manager 315 or 315-a described with reference to FIG. 3 or 4.

At block 610, the method 600 may include comparing the address to one or more fields of a cache management table stored in a buffer before querying the cache memory. The operation(s) at block 610 may be performed according to the methods described with reference to FIG. 2. In some examples, the operation(s) at block 610 may be performed using the cache management manager 315 or 315-a described with reference to FIG. 3 or 4.

At block 615, the method 600 may include identifying a match between the address associated with the request and an address associated with a pending request based at least in part on the comparing. The operation(s) at block 615 may be performed according to the methods described with reference to FIG. 2. In some examples, the operation(s) at block 615 may be performed using the cache management manager 315 or 315-a described with reference to FIG. 3 or 4.

At block 620, the method 600 may include updating a bitmap associated with a different thread in the cache management table. In some examples, the bitmap associates one or more requesting thread with a corresponding cache line. The operation(s) at block 620 may be performed according to the methods described with reference to FIG. 2. In some examples, the operation(s) at block 620 may be performed using the cache management manager 315 or 315-a described with reference to FIG. 3 or 4.

Figure 7:
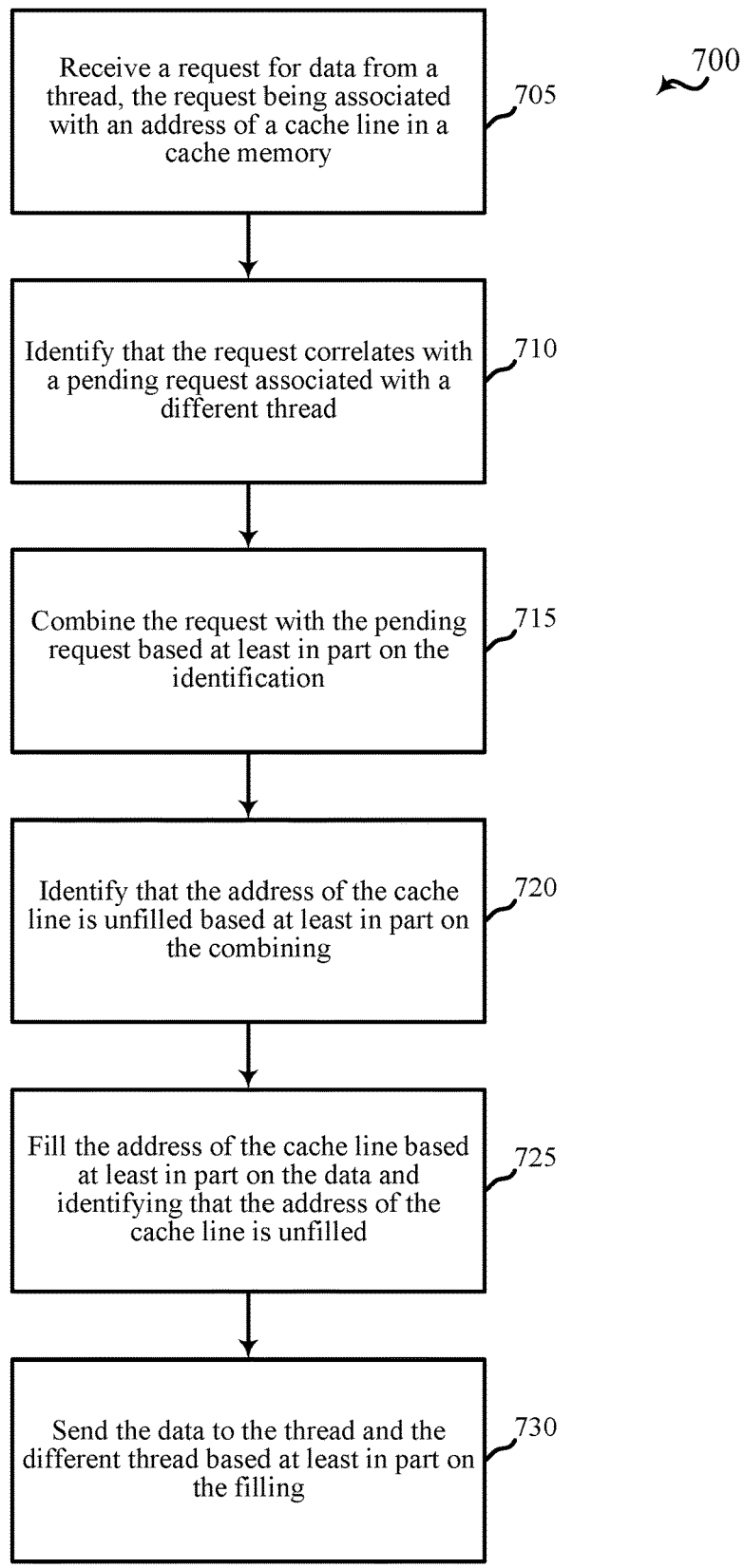
FIG. 7 is a flow chart illustrating an example of a method for reducing shared cache memory requests, in accordance with one or more aspects of the present disclosure.

FIG. 7 is a flow chart illustrating an example of a method 700 for reducing shared cache memory requests, in accordance with one or more aspects of the present disclosure. For clarity, the method 700 is described below with reference to aspects of one or more of the device 115 described with reference to FIGS. 2 and 3, and/or aspects of the cache management table described with reference to FIG. 4. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 705, the method 700 may include receiving a request for data from a thread. In some examples, the request may be associated with an address of a cache line in a cache memory. The operation(s) at block 705 may be performed according to the methods described with reference to FIG. 2. In some examples, the operation(s) at block 705 may be performed using the inline buffer 310 described with reference to FIG. 3. In some examples, the operation(s) at block 705 may be performed using the cache management manager 315 or 315-*a* described with reference to FIG. 3 or 4.

At block 710, the method 700 may include identifying that the request correlates with a pending request associated with a different thread. The operation(s) at block 710 may be performed according to the methods described with reference to FIG. 2. In some examples, the operation(s) at block 710 may be performed using the cache management manager 315 or 315-*a* described with reference to FIG. 3 or 4.

At block 715, the method 700 may include combining the request with the pending request based at least in part on the identifying. The operation(s) at block 715 may be performed according to the methods described with reference to FIG. 2. In some examples, the operation(s) at block 715 may be performed using the cache management manager 315 or 315-*a* described with reference to FIG. 3 or 4.

At block 720, the method 700 may include identifying that the address of the cache line is unfilled based at least in part on the combining. The operation(s) at block 720 may be performed according to the methods described with reference to FIG. 2. In some examples, the operation(s) at block 720 may be performed using the cache management manager 315 or 315-*a* described with reference to FIG. 3 or 4.

At block 725, the method 700 may include filling the address of the cache line based at least in part on the data and identifying that the address of the cache line is unfilled. The operation(s) at block 725 may be performed according to the methods described with reference to FIG. 2. In some examples, the operation(s) at block 725 may be performed using the cache management manager 315 or 315-*a* described with reference to FIG. 3 or 4.

At block 730, the method 700 may include sending the data to the thread and the different thread based at least in part on the filling. In some cases, cache management manager 315 may attach information to the correlated pending request indicating that when a corresponding cache line is returned in response to the pending request, the instruction or data will be made available to all the threads that have been associated with the request. The operation(s) at block 730 may be performed according to the methods described with reference to FIG. 2. In some examples, the operation(s) at block 730 may be performed using the cache management manager 315 or 315-*a* described with reference to FIG. 3 or 4.

In some examples, aspects from two or more of the methods 500, 600, and 700 may be combined. It should be noted that the methods 500, 600, and 700 are just example implementations, and that the operations of the methods 500-700 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of reducing shared cache memory requests, comprising:
   receiving a request for data from a thread, the request being associated with an address of a cache line in a cache memory;
   identifying that the request correlates with a pending request associated with a different thread in a cache management table that tracks pending requests to a higher level memory based at least in part on a first control field of a set of fields in an entry of the cache management table;
   combining the request with the pending request using a bitmap field that comprises a second control field of the set of fields in the entry of the cache management table, the bitmap field associating the thread and the different thread, based at least in part on the identifying;
   determining whether a cache line fill operation to the cache line in the cache memory has been initialized based at least in part on a value in a third control field of the set of fields in the entry of the cache management table; and
   receiving the data after the combining, the receiving being based at least in part on the pending request.

2. The method of claim 1, wherein combining the request with the pending request comprises:
   preventing delivery of the request to the cache memory.

3. The method of claim 1, wherein combining the request with the pending request comprises:
   sending the data to the thread and to the different thread in response to the pending request based at least in part on linking the request and the pending request.

4. The method of claim 1, further comprising:
   identifying that the address of the cache line is unfilled based at least in part on the combining;
   filling the address of the cache line based at least in part on the data and identifying that the address of the cache line is unfilled; and
   sending the data to the thread and the different thread based at least in part on the filling.

5. The method of claim 1, wherein identifying that the request correlates with the pending request comprises:
   comparing the address to one or more fields of the set of fields in the entry of the cache management table stored in a buffer before querying the cache memory.

6. The method of claim 5, wherein the one or more fields comprise:
   at least one of a data field and a control field.

7. The method of claim 6, wherein the data field comprises:
   addresses associated with data stored in the cache memory, or a higher level memory, or a combination thereof.

8. The method of claim 6, wherein the control field comprises:
   a bit field indicating whether the request is valid.

9. The method of claim 6, further comprising:
   identifying a cache fill operation associated with the pending request based at least in part on information in the control field.

10. The method of claim 5, wherein identifying that the request correlates to the pending request further comprises:
    identifying a match between the address associated with the request and an address associated with the pending request based at least in part on the comparing.

11. The method of claim 10, wherein combining the request with the pending request comprises:
    updating at least some of the one or more fields of the set of fields in the entry of the cache management table based at least in part on the identifying the match.

12. The method of claim 11, wherein updating at least some of the one or more fields of the set of fields in the entry of the cache management table comprises:
    updating the bitmap field associated with the different thread in the cache management table, wherein the bitmap field associates one or more requesting threads with a corresponding cache line.

13. An apparatus for reducing shared cache memory requests, comprising:

a processor;
memory in electronic communication with the processor; and
the processor and memory configured to:
receive a request for data from a thread, the request being associated with an address of a cache line in a cache memory;
identify that the request correlates with a pending request associated with a different thread in a cache management table that tracks pending requests to a higher level memory based at least in part on a first control field of a set of fields in an entry of the cache management table;
combine the request with the pending request using a bitmap field that comprises a second control field of the set of fields in the entry of the cache management table, the bitmap field associating the thread and the different thread, based at least in part on the identifying;
determine whether a cache line fill operation to the cache line in the cache memory has been initialized based at least in part on a value in a third control field of the set of fields in the entry of the cache management table; and
receive the data after the combining, the receiving being based at least in part on the pending request.

14. The apparatus of claim 13, wherein combining the request with the pending request comprises:
preventing delivery of the request to the cache memory.

15. The apparatus of claim 13, wherein combining the request with the pending request comprises:
sending the data to the thread and to the different thread in response to the pending request based at least in part on linking the request and the pending request.

16. The apparatus of claim 13, further comprising:
identifying that the address of the cache line is unfilled based at least in part on the combining;
filling the address of the cache line based at least in part on the data and identifying that the address of the cache line is unfilled; and
sending the data to the thread and the different thread based at least in part on the filling.

17. The apparatus of claim 13, wherein identifying that the request correlates with the pending request comprises:
comparing the address to one or more fields of the set of fields in the entry of the cache management table stored in a buffer before querying the cache memory.

18. The apparatus of claim 17, wherein the one or more fields comprise:
at least one of a data field and a control field.

19. The apparatus of claim 18, wherein the data field comprises:
addresses associated with data stored in the cache memory, or a higher level memory, or a combination thereof.

20. The apparatus of claim 18, wherein the control field comprises:
a bit field indicating whether the request is valid.

21. The apparatus of claim 18, further comprising:
identifying a cache fill operation associated with the pending request based at least in part on information in the control field.

22. The apparatus of claim 17, wherein identifying that the request correlates to the pending request further comprises:
identifying a match between the address associated with the request and an address associated with the pending request based at least in part on the comparing.

23. The apparatus of claim 22, wherein combining the request with the pending request comprises:
updating at least some of the one or more fields based at least in part on the identifying the match.

24. The apparatus of claim 23, wherein updating at least some of the one or more fields of the set of fields in the entry of the cache management table comprises:
updating the bitmap field associated with the different thread in the cache management table, wherein the bitmap field associates one or more requesting threads with a corresponding cache line.

25. An apparatus for reducing shared cache memory requests, comprising:
means for identifying that the request correlates with a pending request associated with a different thread in a cache management table that tracks pending requests to a higher level memory based at least in part on a first control field of a set of fields in an entry of the cache management table;
means for combining the request with the pending request using a bitmap field that comprises a second control field of the set of fields in the entry of the cache management table, the bitmap field associating the thread and the different thread, based at least in part on the identifying;
means for determining whether a cache line fill operation to the cache line in the cache memory has been initialized based at least in part on a value in a third control field of the set of fields in the entry of the cache management table; and
means for receiving the data after the combining, the receiving being based at least in part on the pending request.

26. The apparatus of claim 25, wherein combining the request with the pending request comprises:
means for preventing delivery of the request to the cache memory.

27. The apparatus of claim 25, wherein combining the request with the pending request comprises:
means for sending the data to the thread and to the different thread in response to the pending request based at least in part on linking the request and the pending request.

28. The apparatus of claim 25, further comprising:
means for identifying that the address of the cache line is unfilled based at least in part on the combining;
means for filling the address of the cache line based at least in part on the data and identifying that the address of the cache line is unfilled; and
means for sending the data to the thread and the different thread based at least in part on the filling.

29. The apparatus of claim 25, wherein identifying that the request correlates with the pending request comprises:
means for comparing the address to one or more fields of the set of fields in the entry of the cache management table stored in a buffer before querying the cache memory.

30. A non-transitory computer-readable medium storing computer-executable code for wireless communication, the code executable by a processor to:
receive a request for data from a thread, the request being associated with an address of a cache line in a cache memory;
identify that the request correlates with a pending request associated with a different thread in a cache management table that tracks pending requests to a higher level memory based at least in part on a first control field of a set of fields in an entry of the cache management table;

combine the request with the pending request using a bitmap field that comprises a second control field of the set of fields in the entry of the cache management table, the bitmap field associating the thread and the different thread, based at least in part on the identifying;

determine whether a cache line fill operation to the cache line in the cache memory has been initialized based at least in part on a value in a third control field of the set of fields in the entry of the cache management table; and receive the data after the combining, the receiving being based at least in part on the pending request.

* * * * *